United States Patent
Botros et al.

(10) Patent No.: US 8,100,671 B2
(45) Date of Patent: Jan. 24, 2012

(54) TANDEM SUPERSONIC EJECTORS FOR THE REPRESSURIZATION OF AN OFF GAS

(75) Inventors: Kamal K. Botros, Calgary (CA); John Geerligs, Calgary (CA); Hasan Imran, Calgary (CA)

(73) Assignee: TransCanada Pipelines Limited, Calgary (CA)

( * ) Notice: Subject to any disclaimer, the term of this patent is extended or adjusted under 35 U.S.C. 154(b) by 1077 days.

(21) Appl. No.: 11/809,342

(22) Filed: May 31, 2007

(65) Prior Publication Data
US 2008/0105315 A1 May 8, 2008

(30) Foreign Application Priority Data

Sep. 25, 2006 (CA) ...................................... 2560814

(51) Int. Cl.
*F04F 5/22* (2006.01)
(52) U.S. Cl. ...................... 417/163; 417/174; 60/39.5
(58) Field of Classification Search .................. 417/163, 417/165, 170, 174, 77, 179; 60/39.5, 39.465; 137/14
See application file for complete search history.

(56) References Cited

U.S. PATENT DOCUMENTS

| | | | | |
|---|---|---|---|---|
| 1,449,220 A * | 3/1923 | Ehrhart | ......................... | 417/170 |
| 1,777,239 A * | 9/1930 | Weir | .............................. | 417/174 |
| 1,806,941 A * | 5/1931 | Hale | .............................. | 417/170 |
| 2,555,812 A * | 6/1951 | Plummer, Jr. | .................. | 417/169 |
| 2,937,140 A * | 5/1960 | Stinson | ........................ | 208/340 |
| 3,064,878 A * | 11/1962 | Bayles et al. | .................... | 417/54 |
| 3,932,111 A * | 1/1976 | Liknes et al. | ................. | 431/202 |
| 4,379,679 A * | 4/1983 | Guile | ............................. | 417/54 |
| 4,430,046 A * | 2/1984 | Cirrito | ........................... | 417/55 |
| 5,195,587 A * | 3/1993 | Webb | ........................... | 166/267 |
| 5,647,221 A | 7/1997 | Garris, Jr. | | |
| 5,733,417 A * | 3/1998 | Foral | ............................. | 203/18 |
| 5,839,884 A * | 11/1998 | Beylich | ......................... | 417/196 |
| 6,418,957 B1 * | 7/2002 | Goodyear | ....................... | 137/14 |
| 6,666,027 B1 * | 12/2003 | Cardenas, Jr. | .................. | 60/772 |
| 7,624,564 B2 * | 12/2009 | Stuttaford et al. | .......... | 60/39.281 |
| 2005/0142004 A1 | 6/2005 | Appleford et al. | | |
| 2008/0127950 A1 * | 6/2008 | Malm | ........................... | 123/527 |
| 2008/0251129 A1 * | 10/2008 | Hoffart | .......................... | 137/14 |
| 2009/0320478 A1 * | 12/2009 | Head | .............................. | 60/657 |

OTHER PUBLICATIONS

Choi, et al., An experimental study of sonic/supersonic ejector flows, Transactions of the Korean Society of Mechanical Engineers, vol. 26, May 2002, pp. 640-647.*

* cited by examiner

*Primary Examiner* — Devon C Kramer
*Assistant Examiner* — Nathan Zollinger
(74) *Attorney, Agent, or Firm* — Kenneth H Johnson

(57) ABSTRACT

Low pressure off gases such as from dry gas seals may be recompressed to a higher pressure using multiple tandem supersonic ejectors in which upstream ejectors operate at a higher nozzle exit Mach number than down stream ejectors and all ejectors are operated at exit Mach numbers greater than 1.

20 Claims, 5 Drawing Sheets

TANDEM SUPERSONIC EJECTORS FOR THE REPRESSURIZATION OF AN OFF GAS

FIELD OF THE INVENTION

The present invention relates to the recovery and recompression of off gasses. The off gases may be from any source including a compressor station on a gas pipeline or a source in a chemical plant. The off gases are recompressed and may be fed back to the same or another chemical reaction or may be fed to a power means such as a gas fired boiler or a gas fired turbine. In accordance with the present invention the off gases may be recompressed using tandem supersonic ejectors.

BACKGROUND OF THE INVENTION

Ejectors, sometimes called gas (e.g. steam) ejectors or venturi ejectors are well known. They may be used to maintain a vacuum or to compress a gas. The advantage of the ejector over conventional mechanical pumps such as piston pumps or compressors and diaphragm pumps is that it has no moving parts and is generally robust (subject to filtering the gas streams to reduce pitting and corrosion). Typically ejectors are subsonic, as supersonic ejectors tend to produce a low pressure exit stream. Additionally supersonic ejectors are sensitive to the design/construction parameters.

An ejector typically comprises an expansion nozzle port through which a motive gas enters the ejector through an inlet port. The gas is expanded to a lower pressure as it passes through a constricted throat section of the nozzle. Generally there is a suction port opening into an enclosed chamber about the expansion nozzle through which the gas to be captured is drawn into the ejector. Then downstream of the expander there is a diffuser section having an inlet, a throat section and a diverging discharge section.

Conventional subsonic ejectors are commonly used to maintain a vacuum on a system such as disclosed in the following patents.

U.S. Pat. No. 5,380,822 issued Jan. 10, 1995 discloses the use of a gas, typically steam, ejector to maintain a lower pressure in the later stages of a falling strand devolatilizer than in the down stream condenser to prevent water from freezing. This patent doesn't teach supersonic ejectors nor does it suggest ejectors could be used in sequence or in tandem.

U.S. Pat. No. 6,855,248 Issued Feb. 15, 2005 to Oliver et al. assigned to Sulzer Chemtech Limited teaches the use of a steam ejector to maintain a vacuum on a processing column (example 1). The patent does not teach the use of a gas ejector to recycle off gases. Further the patent does not teach tandem supersonic ejectors.

U.S. Pat. No. 6,330,821 issued Dec. 18, 2001 to Arnold et al. assigned to The Goodyear Tire & Rubber Company teaches the use of a gas ejector to maintain a vacuum on a part being tested. The patent does not teach the use of a gas ejector to recycle off gases. Further the patent does not teach tandem supersonic ejectors.

U.S. Pat. No. 4,194,924 issued Mar. 25, 1898 assigned to The United States of America as represented by the Secretary of the Air teaches distilling a carrier solvent and JP-4 in a heated vacuum column in which the vacuum is provided by a gas (steam) ejector. The patent does not teach the use of a gas ejector to recycle off gases. Further the patent does not teach tandem supersonic ejectors.

U.S. Pat. No. 4,834,343 issued May 30, 1989 to Boyles teaches a non flooded treatment column including a venturi device within the top of the column to redisperse the gas beneath the fluid level (FIG. 6 and Col. 7 lines 60 to 65). However, the patent does not teach supersonic ejectors nor does it teach tandem ejectors or venturi's. Further the patent does not teach off gases which have escaped a containment zone such as a seal.

The present invention seeks to provide a simple and economical process to capture off gases and recompress them to be used at a higher pressure.

SUMMARY OF THE INVENTION

The present invention provides a process for the repressurization of an off gas at a pressure from 68.94 kPa-g (10 psig) to 344.7 kPa-g (50 psig) and to a pressure from 2068.2 kPa-g (300 psig) to 3447 kPa-g (500 psig) comprising using two or more supersonic gas ejectors in tandem wherein an upstream supersonic ejector operates at an exit nozzle Mach number greater than the exit nozzle Mach number of the subsequent down stream supersonic ejectors and all ejectors operate at a nozzle exit Mach numbers greater than 1.

Preferably there are first and second supersonic gas ejectors in tandem wherein the first supersonic gas ejector is operated at an exit Mach number greater than 2, the second gas ejector is operated at an exit Mach number less than 2, and both of which are operated at exit Mach numbers greater than 1.0.

DETAILED DESCRIPTION

In the handling of gaseous or volatile materials such as $C_{1-8}$ aliphatic or aromatic hydrocarbons which may be unsubstituted or further substituted by one or more $C_{1-4}$ alkyl radicals, inert gases, CO, $CO_2$, $N_2$, natural gas and mixtures thereof the gases may be used in side processes or be subject to leakage from joints or seals, for example drive trains or shafts for compressors or stirrers. One particularly useful type of seal for a shaft is a dry-gas seal.

A typical dry-gas seal is a non-contact end face seal in which the sealing mechanism is comprised of two rings: the first ring with grooves etched in the seal face, which rotates with the shaft, is known as the mating ring, while the second ring has a smooth face and is restrained from movement except along the axis of the shaft. A pair of these seals often co-exists; hence provide a two-stage sealing effect.

For successful operation, it is essential that a steady flow of clean seal gas be supplied to the gaps between the rings. The seal supply gas source must be at a higher pressure than that of the process gas that is being sealed in order for flow to occur. On overhung compressors only one dry seal is required, in which case the seal supply gas can be drawn from the compressor discharge, filtered, and supplied in a steady flow to the seal capsule. Most of the seal supply gas re-enters the process cavity, while a small volume (leakage) passes through the seal faces and is vented. The amount of gas leakage depends on the process pressure and rotating shaft diameter.

In the operation of a pipeline at a compressor station the gas used in the dry-gas seal is typically the gas being passed through the pipeline. The gas pressure is typically from 5515.2 kPa-g (800 psig) to 6894 kPa-g (1000 psig), preferably from 6204.6 kPa-g (900 psig) to 6894 kPa-g (1000 psig), and passed through the seal. The off gas (or vent gas or buffer gas) from the seal is typically at a pressure from 68.94 kPa-g (10 psig) to 344.7 kPa-g (50 psig), preferably from 207 kPa-g (30 psig) to 344.7 kPa-g (50 psig). Generally the flow rate of the off gas is low, typically from 1-3 kg/hour.

For a chemical plant the off gas pressures and rates may be comparable.

The off gas or buffer gas may be captured in a housing generally air tight around the seal. However, the off gas or buffer gas is at too low a pressure to do very much with it. At a chemical plant the pressure of the off gas may be too low to feed directly to a flare stack, or directed back to the chemical process or to a power generation means such as a gas fired boiler or a gas fired turbine.

Figure 1:
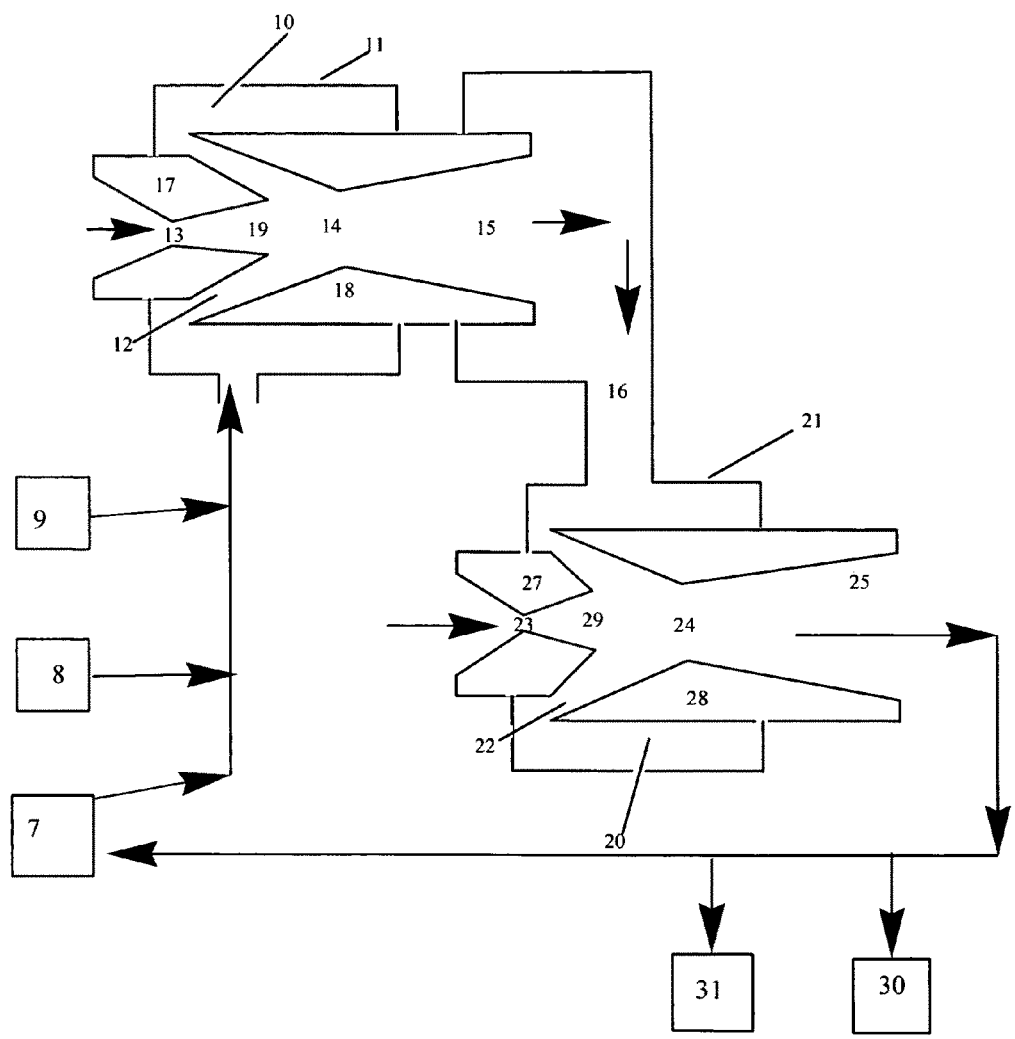
FIG. 1 is a schematic sectional drawing of the tandem supersonic ejectors of the present invention.

FIG. 1 is a sectional schematic diagram of tandem supersonic ejectors in accordance with the present invention. In the Figure there are two supersonic ejectors 10, and 20 in tandem. The first supersonic ejector comprises an enclosure 11, which is airtight or substantially airtight that encloses a suction port 12. The suction port 12 of the first supersonic ejector 10 may be annular. The motive gas enters the nozzle 17 of the first supersonic ejector, is expanded through a constricted throat 13, and is further expanded through the diverging section of the nozzle to a much lower pressure and high supersonic velocity. This supersonic velocity of the motive gas as it exits nozzle 17 at exit 19 of the first supersonic ejector 10 and the resulting reduction in the pressure draws the off gas (e.g. from a dry seal 9, purge bin 7, or a reaction 8) into the ejector through suction port 12. The combined motive gas and the off gas proceed to diffuser 18 of the first supersonic ejector having a larger throat 14 than that of the nozzle 17. The cross sectional area of the throat 14 of the diffuser of the first ejector is larger in size than the cross sectional area of the throat 13 of the nozzle 17. Due to the converging and then diverging sections of the cross section area of the channel through the diffuser the speed of the motive gas and entrained off gas decreases. The mixture of the motive gas and the off gas exit the ejector at the end 15 of the diffuser 18 at higher pressure than that of the off gas. The end of the diffuser 15 exits into a conduit 16 leading to an enclosure 21, which is air tight or substantially air tight, that encloses a suction port 22 of the second supersonic ejector 20. The suction port 22 of the second supersonic ejector 20 may be annular.

The motive gas enters the nozzle 27 of the second supersonic ejector and proceeds to the constricted throat 23, is expanded through the diverging section of the nozzle 27 exits the nozzle at exit 29 and proceeds to diffuser 28 having a larger throat 24 than throat 23 of nozzle 27. The cross sectional area of the channel through the second supersonic ejector also increases in size from throat 23 of the nozzle 27 to the throat 24 of the diffuser 28. This increases the velocity of the motive gas as it passes through throat 23 and the diverging section of the nozzle 27 and reduces the pressure drawing the exit gas from the first supersonic ejector passing through port 16 into the ejector through suction port 22. Due to the converging and diverging cross section areas of the channel through the diffuser the speed of the motive gas and entrained off gas decreases in the diffuser. The mixture of the motive gas and the gas in port 16 exit the ejector at the end 25 of the diffuser 28. Exit port 25 from diffuser 28 of the second supersonic ejector feeds a pipe or line to recirculate the off gas combined with the motive gas for further processing.

In operation a motive gas at a higher pressure than the off gas, in the case of a pipeline the natural gas within the line and in the case of a chemical plant likely process steam is injected into nozzle 17 of the first supersonic ejector 10. The cross section area of the ejector narrows to a throat section 13 of the first supersonic ejector. This increases the velocity of the gas as it passes through the throat and continues to expand through the diverging section of nozzle 17 to exit 19, which creates a lower pressure at the suction inlet 12 of the first supersonic ejector 10. This draws the off gas within the enclosure 11 into the first supersonic ejector. The off gas is drawn into and entrained with the motive gas passing through the first supersonic ejector. Downstream the cross section area of the throat 14 of the diffuser 18 is larger than throat 13 of the nozzle 17. The diffuser 18 expands to a discharge 15 and is fed to the suction port 22 for the second supersonic ejector 20. A second feed of common motive gas is fed to the nozzle 27 of the second supersonic ejector, which narrows to throat 23. The gas velocity increases and the pressure drops drawing the off gas into the nozzle and leaves at exit 29. The cross section area of the second supersonic ejector also increases to a throat 24 of the diffuser 28 and further then expands to a discharge port 25. The discharge port 25 then feeds a line (not shown) which directs the recompressed off gas to subsequent processing (e.g. to a flare stack 30, a power plant 31 or back to reaction 7) at a higher pressure.

In a preferred embodiment of the invention the nozzles (17 and 27) of the supersonic ejectors are adjustable relative to the diffusers. Typically this is done by having the nozzle threaded and mounted on receiving threads on the enclosure or on a portion of the inlet to the diffuser in a manner not to close the suction port.

The ejectors should be designed so that the first supersonic ejector is operated at an exit Mach number from 2.4 to 2.6 and the second supersonic ejector is operated at an exit Mach number from 1.6 to 1.8. In the first supersonic ejector the ratio of the cross section area of the nozzle exit 19 to the nozzle throat 13 may be from 2.9 to 3.2, preferably from 3.0 to 3.1. In the second supersonic ejector the ratio of the cross section area of the nozzle exit 29 to the nozzle throat 23 may be from 1.30 to 1.45, preferably from 1.35 to 1.40. The ratio of the area of the throat 14 of the diffuser 18 to the throat 13 of the nozzle 17 of the first supersonic ejector may range from about 4.60 to about 4.90, preferably from 4.70 to 4.80. The ratio of the area of the throat 24 of the diffuser 28 to the throat 23 of the nozzle 27 of the second supersonic ejector may range from about 1.70 to about 1.90, preferably from 1.80 to 1.90. Typically the ratio of the motive gas flow rate to the first supersonic gas ejector to the off gas flow rate is from 32 to 45. (e.g. either g per g or Kg per Kg as this is a unitless ratio). Typically the ratio between the motive gas flow rate to the second supersonic gas ejector and the discharge flow from the first supersonic ejector is from 20 to 25.

The design parameters for the supersonic ejectors are well known to those skilled in the art.

Without being bound by theory, the one-dimensional governing equations for the isentropic expansion of gas through a converging-diverging supersonic nozzle can be written as follows wherein in the following equations A—cross sectional area c—local speed of sound ṁ—mass flow rate
M—Mach number
P—pressure
u—local velocity
s—entropy
T—temperature
Ψ—exergy
ρ—density
Subscript:
1—motive gas to $1^{st}$ stage ejector
2—suction gas to $1^{st}$ stage ejector
3—exit gas from $1^{st}$ stage ejector
in—motive gas to $1^{st}$ stage ejector
out—motive gas to $1^{st}$ stage ejector
r reference condition for the exergy:
Energy:

$$udu = -\frac{1}{\rho}(dP)_s \qquad (1)$$

Continuity:

$$\frac{dA}{A} = -\frac{d\rho}{\rho} - \frac{du}{u} \qquad (2)$$

Using the isentropic relation:

$$\left(\frac{dP}{d\rho}\right)_s = c^2 \qquad (3)$$

And substituting from (1) and (3) in (2) we can write the continuity equation in the form:

$$\frac{dA}{A} = \frac{1}{\rho}\left(\frac{1}{u^2} - \frac{1}{c^2}\right)(dP)_s \qquad (4)$$
$$= \frac{1-M^2}{\rho u^2}(dP)_s$$

where, subscript 's' refers to isentropic (i.e. at constant entropy).

Equations (1) and (4) are solved simultaneously along a known geometry-diverging nozzle to delineate the pressure profile along the nozzle as well as all other local flow parameters. A proper equation of state, such as American Gas Association Report Number 8 equation of state for hydrocarbon gases (AGA-8), must be utilized to account for real gas properties. For example for a supersonic nozzle with an exit to throat area ratio of 3.06, the calculated expansion pressure ratio based on the above formulation and accounting for real gas behavior is 18.7, and exit Mach number=2.54 (for a stagnation inlet pressure of 5500 kPa-g and temperature of 283 K).

In a gas transmission line the recompressed off gas—natural gas may be fed to a power means such as a gas fired turbine. For a chemical plant the recompressed off gas may be fed to a power means such as a gas fired boiler or it could be fed to a flare gas tower or it could be recycled back to the process.

EXAMPLES

The present invention is illustrated by the following non-limiting examples.

Example 1

Computational Fluid Dynamics

Figure 2:
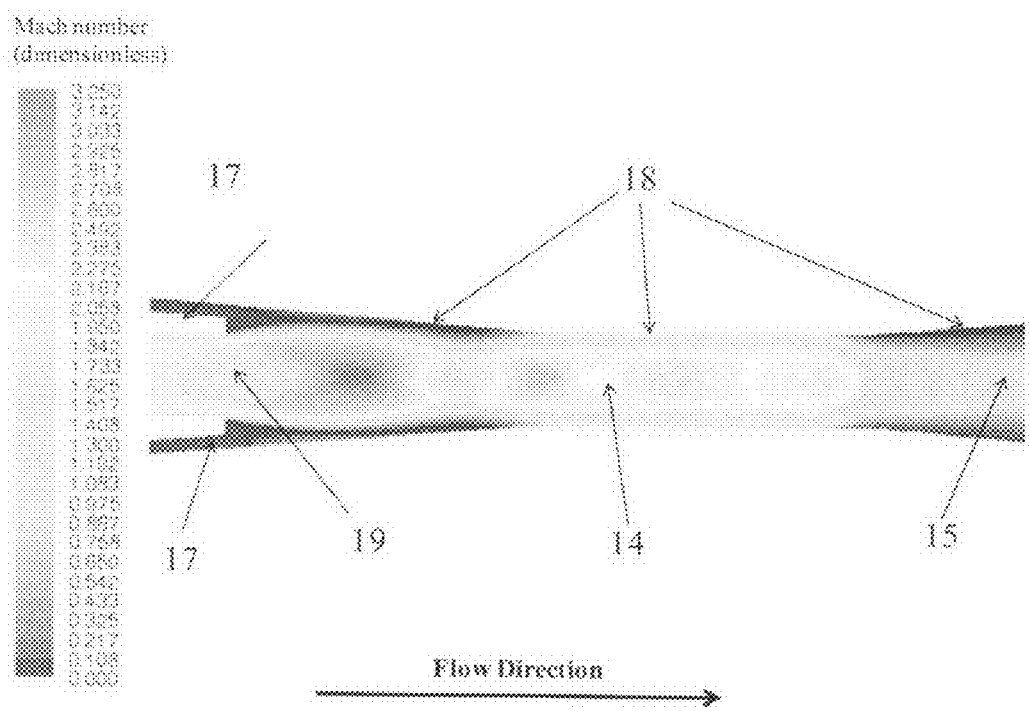
FIG. 2 shows Mach number contours at the exit of a supersonic nozzle and diffuser.
Figure 3:
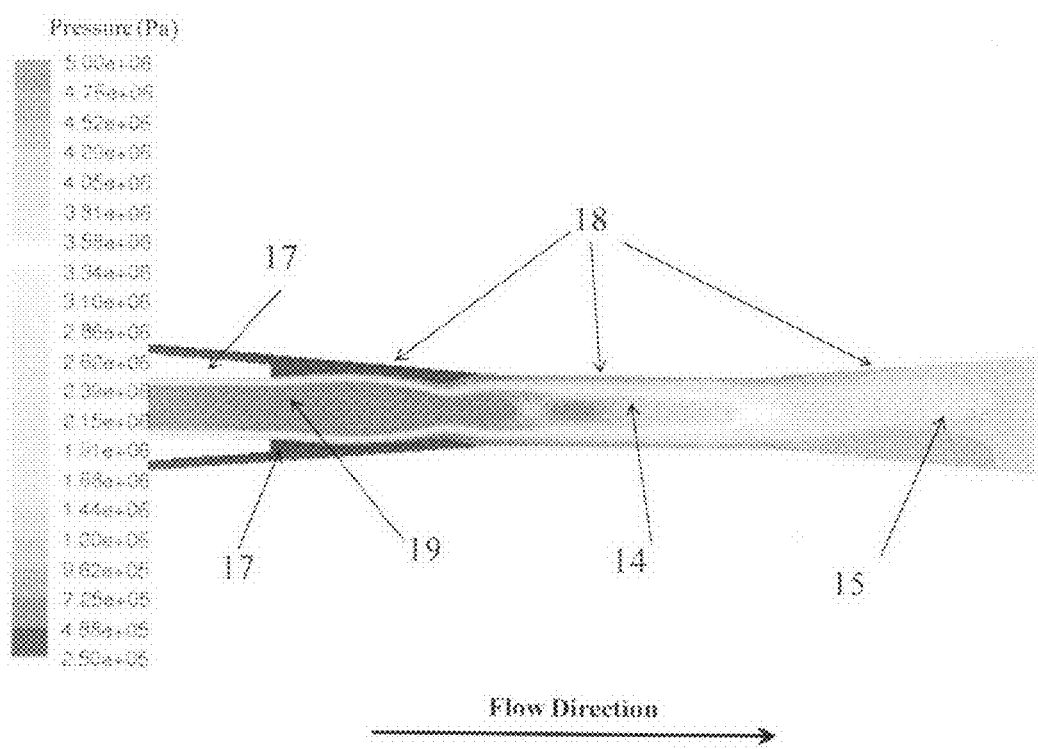
FIG. 3 shows Stagnation Pressure Contours at Exit of Supersonic Nozzle and Diffuser.

In order to arrive at the optimum design of a fixed-geometry diffuser that could work with different nozzles of different throat areas, Computational Fluid Dynamics (CFD) analysis was carried out to discern the flow field. FIGS. 2 and 3 show an example of CFD results showing the Mach number and stagnation pressure at nozzle exit and through the diffuser. This is an example of an optimized nozzle/diffuser arrangement showing that the nozzle is clear from a standing shock wave, which is good for suction. It is also shown that the shock wave region (which is the region were Mach number drops sharply from supersonic to subsonic—FIG. 2) is located at the throat of the diffuser or slightly downstream. This is also preferable for minimum stagnation pressure losses, as is also confirmed by the stagnation pressure contours of FIG. 3.

In order to further assess the efficiency of the ejector (combined of both elements: nozzle and diffuser), the following definition of ejector efficiency was adopted:

$$\eta = \frac{(\dot{m}_1 + \dot{m}_2)\psi_3}{\dot{m}_1\psi_1} \qquad (5)$$

where; ψ is the thermodynamic availability (exergy), subscript 1, 2, 3 refer to motive, suction and discharge conditions. Exergy is defined with reference to suction condition, hence:

$$\psi_1 = (h_1 - h_r) - T_r(s_1 - s_r) \qquad (6)$$

$$\psi_3 = (h_3 - h_r) - T_r(s_3 - s_r) \qquad (7)$$

The above definition was used later in assessing the various nozzle geometry and respective position with respect to the diffuser.

Example 2

First Supersonic Ejector

Based on the above calculations, and in order to satisfy the relatively low suction pressure to match the dry-gas seal leakage pressure (~400 kPa-a), an ejector with a highly supersonic exit flow was employed. A flexible prototype design was fabricated which allows for various geometry supersonic nozzles to be tested with a fixed geometry diffuser, but it also allows for fine adjustments of the position of the nozzle exit in relation to the diffuser inlet (either positively, i.e. inserted into the diffuser inlet section, or negatively, i.e. retrieved back with a gap in between nozzle exit and diffuser inlet).

The supersonic diffuser has an inlet diameter of 4 mm, a throat diameter of 3.5 mm and length of 8 mm, and an exit diameter of 18 mm. Inlet ½-angle of the inlet section is 4.7°, while that of the exit section is 5°. Several supersonic converging/diverging nozzles were fabricated with different throat diameters and exit/throat area ratios as shown in Table 1.

TABLE 1

Various Supersonic Nozzle Tested in the 1st Stage Ejector

| Throat (mm) | Exit (mm) | Area Ratio |
| --- | --- | --- |
| 3 | 4.5 | 2.25 |
|  | 8 | 7.11 |
| 2 | 2.5 | 1.56 |
|  | 3 | 2.25 |
|  | 3.5 | 3.06 |
|  | 4 | 4.00 |
|  | 5 | 6.25 |
| 1.6 | 2.4 | 2.25 |
|  | 2.8 | 3.06 |

The various nozzles were tested at the TransCanada Pipelines Limited test facility at Didsbury, Alberta. Suction gas was drawn from the same pipeline gas, which then flows through two-step regulators that throttle the line pressure to the specified maximum suction pressure. A summary of the results of the experiment is reported in Table 2.

TABLE 2

Summary Results of 1st Stage Supersonic Ejector Testing

| Nozzle | Compression Ratio (P3/P2) | Expansion Ratio (P1/P2) | Efficiency | Comment |
| --- | --- | --- | --- | --- |
| 1.6 × 2.8 | 3.5 | 20 | 0.46 | P1 = 5000 kPa |
| 1.6 × 2.8 | 3 | 16 | 0.46 | P1 = 4000 kPa |
| 1.6 × 2.4 | 3.6 | 19 | 0.48 | P1 = 5000 kPa |
| 1.6 × 2.4 | 2.9 | 16 | 0.44 | P1 = 4000 kPa |
| 2 × 3.5 | 4.5 | 17 | 0.56 | P1 = 5000 kPa |
| 2 × 3.5 | 4.3 | 15 | 0.56 | P1 = 4000 kPa |
| 2 × 3 | 4.1 | 15 | 0.56 | P1 = 4000 kPa |

In the table the efficiency is defined by Equation (5) above.

The best performing 1st stage stand-alone configuration is given in Table 3, where the position of the nozzle exit is inserted 20.5 mm into the diffuser inlet section.

TABLE 3

Characteristic Dimensions of the Best 1st Stage Ejector

| | | |
| --- | --- | --- |
| Nozzle Diameter | mm | 1.6 |
| Nozzle Exit | mm | 2.8 |
| Half Angle | deg | 1 |
| Diffuser Inlet Diamter | mm | 4 |
| Half Angle | deg | 4.7 |
| Diffuser Throat Diameter | mm | 3.5 |
| Diffuser Throat Length | mm | 8 |
| Diffuser Exit Diameter | mm | 18 |
| Diffuser Exit Half Angle | deg | 5 |

Example 3

Second Stage Ejector

Computational Fluid Dynamics (CFD) was utilized to optimize the best supersonic diffuser dimensions (throat, inlet, and outlet diameters, as well as angles) and position of the nozzle with respect to the diffuser inlet. Table 4 shows the optimum design for the second stage ejector.

TABLE 4

Characteristic Dimensions of the 2nd Stage Ejector

| | | |
| --- | --- | --- |
| Nozzle Diameter | mm | 7.4 |
| Nozzle Exit | mm | 8.7 |
| Half Angle | deg | 1 |
| Diffuser Inlet Diamter | mm | 12.4 |
| Half Angle | deg | 1 |
| Diffuser Throat Diameter | mm | 10 |
| Diffuser Throat Length | mm | 25 |
| Diffuser Exit Diameter | mm | 30 |
| Diffuser Exit Half Angle | deg | 5 |

Tests were conducted on the 2nd stage ejector alone in order to optimize the position of its supersonic nozzle with respect to the diffuser inlet. The best performance was obtained with the position of the nozzle exit at 1.42 mm away from the inlet section of the supersonic diffuser in this 2nd stage ejector. At this nozzle position, the discharge pressure ($P_{out}$) reaches 3400 kPa-g.

Example 4

Combined First and Second Stage Ejectors

Figure 4:
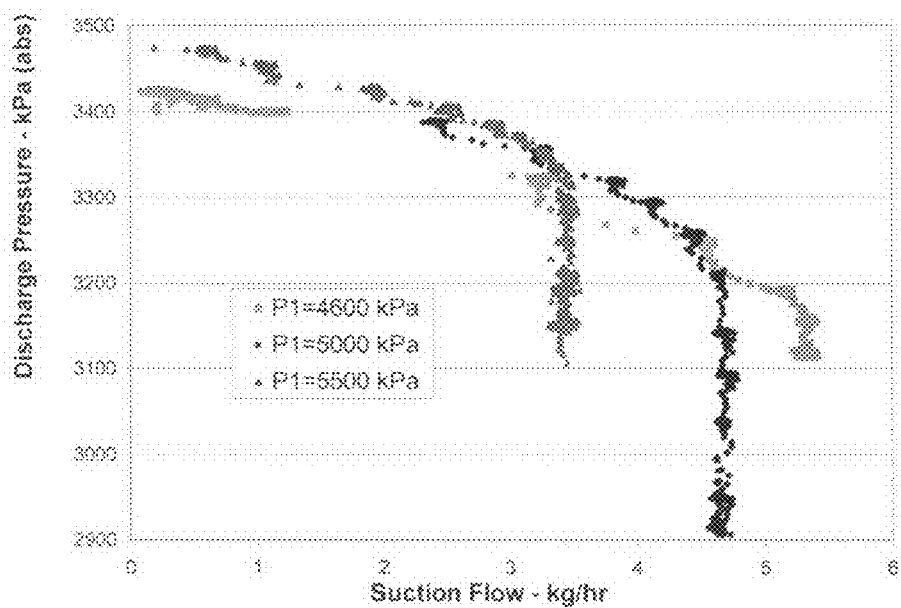
FIG. 4 shows the overall performance of the two-Stage Supersonic Ejector (discharge pressure from $2^{nd}$ stage vs. suction flow at $1^{st}$ stage FIG. 5 shows overall performance of the two-Stage Supersonic Ejector (suction pressure vs. suction flow at $1^{st}$ stage).
Figure 5:
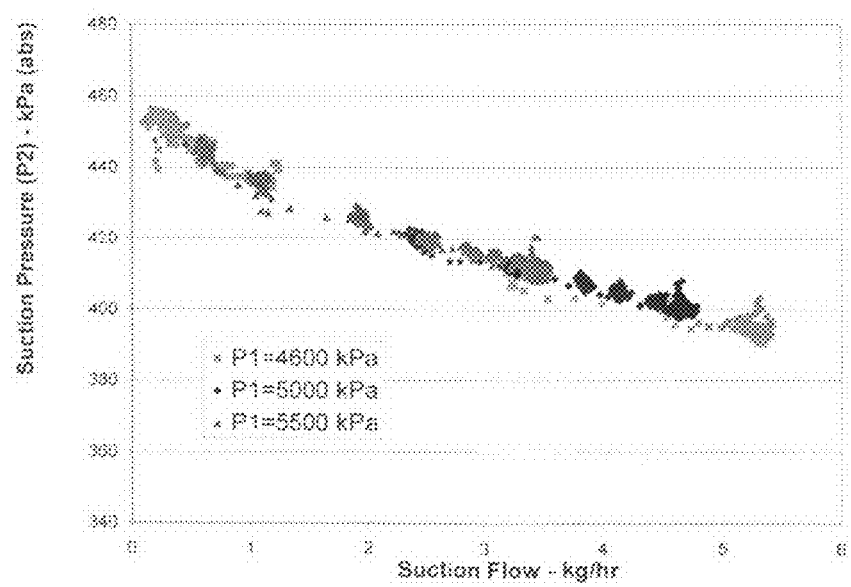
Figure 6:
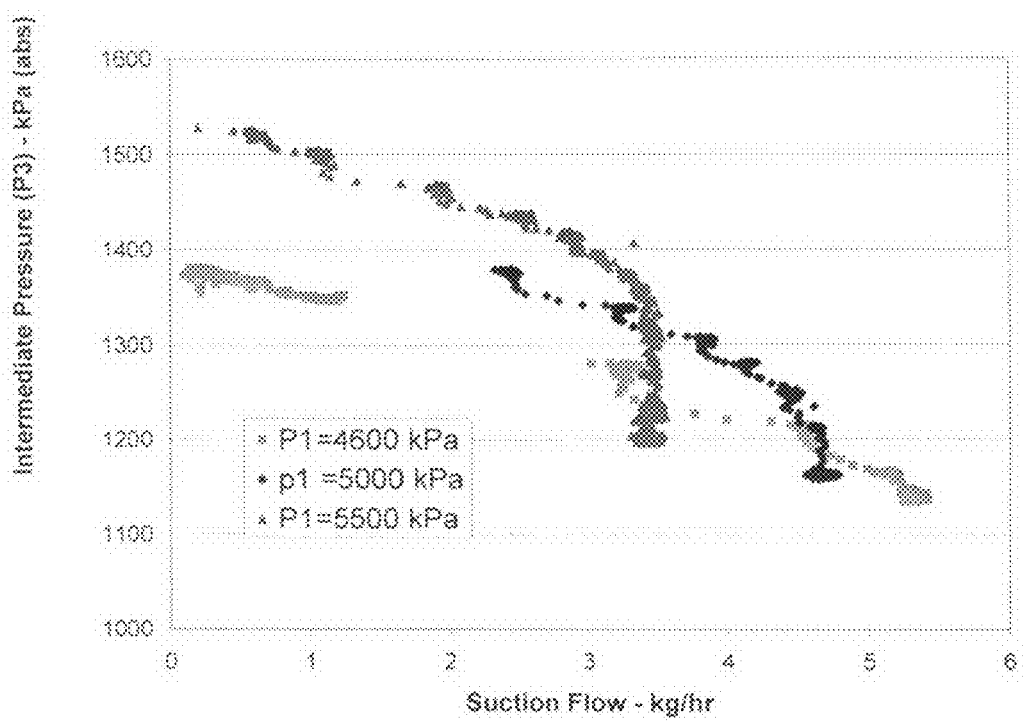
FIG. 6 shows overall performance of the two-Stage Supersonic Ejector (intermediate pressure between the two stages vs. suction flow at $1^{st}$ stage).

Tests were then conducted at the Didsbury facility on the two-stage ejector configuration combined, by varying $P_1$ to the 1st stage ejector (4600 kPa-g, 5000 kPa-g and 5500 kPa-g), while maintaining the motive gas pressure ($P_{in}$) to the 2nd stage ejector at maximum line pressure of approximately 6000 kPa-g. FIGS. 4 through 6 show the results of the integrated two-stage ejector system in terms of the discharge pressure from the 2nd stage ejector (FIG. 4), suction flow at the 1st stage (FIG. 5), and the intermediate pressure ($P_3$) for different $P_1$ (FIG. 6). The effects of varying ($P_1$) are manifested in FIG. 4, which indicates that the lower $P_1$ the higher the suction flow, but at the expense of the overall discharge pressure ($P_{out}$).

The data shows that the present optimized configuration is capable of delivering the required discharge pressure ($P_{out}$) of 3300 kPa-g with a suction flow of 2-2.5 kg/hr and suction pressure ($P_2$) of 340 kPa-g. These values match the requirements for this ejector to work with a dry-gas leakage and a typical fuel gas line on a typical compressor station.

What is claimed is:

1. A process for the repressurization of an off gas at a suction pressure from 68.94 kPa-g (10 psig) to 344.7 kPa-g (50 psig) to a discharge pressure of repressurized gas at the exit of a diffuser of at least one downstream supersonic ejector from 2068.2 kPa-g (300 psig) to 3447 kPa-g (500 psig) comprising:

providing a first supersonic gas ejector and at least one downstream supersonic gas ejector connected in tandem, every ejector having a nozzle and a diffuser;

providing said first supersonic ejector having a ratio of the cross section of the area of the nozzle exit to the nozzle throat from 2.9 to 3.2 and a ratio of the cross section area of the throat of the diffuser to the throat of the nozzle from 4.60 to 4.90 with a flow of said off gas at said suction pressure and a flow of motive gas at a pressure from 4600 kPa-g to 5500 kPa-g;

providing each of said downstream ejectors having a ratio of the cross section of the area of the nozzle exit to the nozzle throat from 1.30 to 1.45 and a ratio of the cross section area of the throat of the diffuser to the throat of the nozzle from 1.70 to 1.90 with a flow of motive gas at a pressure up to 6000 kPa-g and a discharge flow from the immediately upstream supersonic ejector;

operating every ejector's nozzle exit discharge flow to be at a Mach number greater than 1; and operating every upstream ejector's nozzle exit discharge flow to be at a Mach number greater than that at the nozzle exit of the subsequent downstream ejector.

2. A process for the repressurization of an off gas at a suction pressure range of 68.94 kPa-g (10 psig) to 344.7 kPa-g (50 psig) to a discharge pressure at a diffuser exit of a second supersonic ejector of repressurized gas from 2068.2 kPa-g (300 psig) to 3447 kPa (500 psig) comprising;

providing a first and second supersonic gas ejector connected in tandem each ejector having a nozzle and a diffuser;

providing the first supersonic ejector having a ratio of the cross section of the area of the nozzle exit to the nozzle throat from 2.9 to 3.2 to and a ratio of the cross section area of the throat of the diffuser to the throat of the nozzle from 4.60 to 4.90 with a flow of off gas at said suction pressure and a flow of motive gas at a pressure from 4600 kPa-g to 5500 kPa-g;

providing the second supersonic ejector having a ratio of the cross section of the area of the nozzle exit to the nozzle throat from 1.30 to 1.45 and a ratio of the cross section area of the throat of the diffuser to the throat of the nozzle from 1.70 to 1.90 with a flow of motive gas at a pressure up to 6000 kPa-g and the discharge flow from the first supersonic ejector;

operating said first ejector's nozzle exit discharge flow to be at a Mach number greater than 2;

operating the second supersonic gas elector's nozzle exit discharge flow to be at a Mach number less than 2 and greater than 1.

3. The process according to claim 2, wherein the suction pressure of the off gas is from 172.3 kPa-g (25 psig) to 310.1 kPa-g (45 psig).

4. The process according to claim 3, wherein the discharge pressure of repressurized off gas from the diffuser exit of the second supersonic ejector is from 2412.9 kPa-g (350 psig) to 3102.3 kPa-g (450 psig).

5. The process according to claim 4, wherein the off gas is selected from the group consisting of $C_{1-8}$ aliphatic or aromatic hydrocarbons, $C_{1-4}$ alkyl radicals, inert gases, CO, $CO_2$, $N_2$, natural gas and mixtures thereof.

6. The process according to claim 5, wherein the ratio of the flow rate of motive gas to the first supersonic gas ejector to the flow rate of off gas is from 32 to 45.

7. The process according to claim 6, wherein the ratio between the flow rate of motive gas to the second supersonic gas ejector and the discharge flow from the first supersonic ejector is from 20 to 25.

8. The process according to claim 7, wherein the first supersonic ejector is operated at an exit Mach number from 2.4 to 2.6 and the second supersonic ejector is operated at an exit Mach number from 1.6 to 1.8.

9. The process according to claim 8, wherein the off gas is a buffer or seal gas for a dry seal.

10. The process according to claim 9, wherein the off gas is natural gas.

11. The process according to claim 10, wherein the buffer or seal gas is fed to the dry seal at a pressure from 5515.2 kPa-g (800 psig) to 6894 kPa-g (1000 psig).

12. The process according to claim 11, wherein the flow rate of off gas from the dry seal is from 1 to 3 kg/hour.

13. The process according to claim 12, wherein the buffer or seal gas is fed to the first supersonic ejector at a suction pressure from 68.94 kPa-g (10 psig) to 344.7 kPa-g (50 psig).

14. The process according to claim 13, wherein the repressurized off gas is fed to a power generating means.

15. The process according to claim 14, wherein said power generating means is selected from the group consisting of a natural gas fired turbine and a natural gas fired boiler.

16. The process according to claim 8 wherein the off gas is from a chemical reactor or a purge bin.

17. The process according to claim 16, wherein the repressurized off gas is fed to a flare stack.

18. The process according to claim 16, wherein the repressurized gas is fed back to the chemical reactor.

19. The process according to claim 16, wherein the repressurized gas is fed to power means.

20. The process according to claim 19, wherein the power means is selected from the group consisting of a natural gas fired turbine and a natural gas fired boiler.

* * * * *